(12) United States Patent
Fontaine et al.

(10) Patent No.: US 10,028,201 B2
(45) Date of Patent: Jul. 17, 2018

(54) APPARATUS AND METHOD FOR AUTORIZING ACCESS TO A SERVICE ACCORDING TO DEVICE PROXIMITY

(71) Applicant: THOMSON LICENSING, Issy le Moulineaux (FR)

(72) Inventors: Patrick Fontaine, Rennes (FR); Jean-Ronan Vigouroux, Rennes (FR); Erwan Le Merrer, Rennes (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 15/633,874

(22) Filed: Jun. 27, 2017

(65) Prior Publication Data

US 2017/0374605 A1    Dec. 28, 2017

(30) Foreign Application Priority Data

Jun. 28, 2016 (EP) .................... 16305786

(51) Int. Cl.
*H04B 7/00* (2006.01)
*H04W 48/04* (2009.01)
(Continued)

(52) U.S. Cl.
CPC .......... *H04W 48/04* (2013.01); *H04W 4/008* (2013.01); *H04W 4/06* (2013.01); *H04W 4/80* (2018.02); *H04W 8/005* (2013.01); *H04W 84/20* (2013.01)

(58) Field of Classification Search
CPC ......... H04W 48/04; H04W 4/80; H04W 4/06; H04W 4/008; H04W 8/005; H04W 84/20
(Continued)

(56) References Cited

U.S. PATENT DOCUMENTS 6,414,635 B1    7/2002   Stewart et al.
8,904,499 B2   12/2014   Hinsey
(Continued)

FOREIGN PATENT DOCUMENTS

EP    1926263    5/2008
EP    2584797    4/2013
(Continued)

OTHER PUBLICATIONS

Anonymous, "Bluetooth Beacons", Bluetooth Beacon, http://bluetoothbeacons.com, Jan. 2016, pp. 1-5.
(Continued)

*Primary Examiner* — Eugene Yun
(74) *Attorney, Agent, or Firm* — Brian J. Dorini; Patricia A. Verlangieri (57) ABSTRACT

A device and a method for authorizing access to a service on a first device upon detection of a second device located in near proximity, while preferably using broadcast transmission, is disclosed. The second device broadcasts on a second broadcast network a message comprising at least a group identifier common to the set of devices that can access the service and a time reference value corresponding to the emission time of the message, according to a common time reference received by all devices from a first broadcast network. The first device authorizes access to the service only if the group identifier received from the message is the same as the group identifier of the device and if the delay between the measured arrival of the message and its emission time is lower than a threshold.

14 Claims, 3 Drawing Sheets

(51) Int. Cl.
*H04W 4/06* (2009.01)
*H04W 4/00* (2018.01)
*H04W 8/00* (2009.01)
*H04W 4/80* (2018.01)
*H04W 84/20* (2009.01)

(58) Field of Classification Search
USPC ........................................................ 455/41.2
See application file for complete search history.

(56) References Cited

U.S. PATENT DOCUMENTS

| | | |
|---|---|---|
| 9,191,837 B2 | 11/2015 | Roy et al. |
| 2007/0008925 A1 | 1/2007 | Dravida et al. |
| 2008/0148360 A1 | 6/2008 | Karstens |
| 2011/0028091 A1 | 2/2011 | Higgins et al. |
| 2015/0163542 A1 | 6/2015 | Kashyap et al. |
| 2015/0271676 A1 | 9/2015 | Shin et al. |
| 2015/0282046 A1 | 10/2015 | Shin et al. |
| 2015/0334511 A1 | 11/2015 | Rivera et al. |
| 2016/0105903 A1* | 4/2016 | Hessler ............. H04W 72/1231 455/450 |

FOREIGN PATENT DOCUMENTS

| | | |
|---|---|---|
| KR | 20150107151 | 9/2015 |
| WO | WO2005109028 | 11/2005 |
| WO | WO2007121334 | 10/2007 |
| WO | WO2012018130 | 2/2012 |
| WO | WO2015178164 | 11/2015 |

OTHER PUBLICATIONS

Anonymous, "Indoor positioning system", Wikipedia, https://en.wikipedia.org/wiki/Indoor_positioning_system, Jun. 7, 2017, pp. 1-11.

Anonymous, "LassoTag-iBeacon—Black: Bluetooth Low Energy (BLE) Tracking Beacon making Valuables Smarter for iOS/ iPhone/ iPod/ iPad", Amazon, https://www.amazon.com/LassoTag-iBeacon-Bluetooth-Tracking-Valuables, Jan. 2015, pp. 1-5.

Anonymous, "The Google Maps Geolocation API", Google Inc., https://developers.google.com/maps/documentation/geolocation/intro, Jun. 7, 2017, pp. 1-8.

Anonymous, "StickNFind—Bluetooth Powered ultra small Location Stickers", Indiegogo, https://www.indiegogo.com/projects/sticknfind-bluetooth-powered-ultra-small . . . , Sep. 24, 2015, pp. 1-12.

* cited by examiner

APPARATUS AND METHOD FOR AUTORIZING ACCESS TO A SERVICE ACCORDING TO DEVICE PROXIMITY

REFERENCE TO RELATED EUROPEAN APPLICATION

This application claims priority from European Patent Application No. 16305786.2, entitled "APPARATUS AND METHOD FOR AUTORIZING ACCESS TO A SERVICE ACCORDING TO DEVICE PROXIMITY", filed on Jun. 28, 2016, the contents of which are hereby incorporated by reference in its entirety.

TECHNICAL FIELD

The present disclosure relates to the domain of device pairing and more precisely describes an apparatus and a method for securely and automatically authorizing access to a service on a first (slave) device upon detection of a second (master) device located in near proximity that can be implemented using only broadcast messages.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Device pairing is an operation that enables to set up a connection between two remote devices that is used to share data or services between the then paired devices while preventing other devices (not paired) to access the data or services. The prior art comprises a number of different solutions for device pairing. Conventional solutions are based on challenge-response mechanisms requiring a bidirectional transmission channel (such as WiFi or Bluetooth™) to send and receive messages. When one of the devices accesses sensitive or valuable services such as a pay-TV channel or user personal data files, a secure pairing between legitimate devices is preferred, allowing to prevent an unauthorized user with an unauthorized device to access the service. For example, when pairing a smartphone with a Bluetooth car audio system, a secret code is generated by the car audio system, displayed to the user and needs to be entered on the smartphone. The smartphone sends back the code through the Bluetooth communication and the car audio system verifies that the secret code is correct before authorizing the secure pairing. The secret code can advantageously be used to encrypt the communication between the devices. Conventional replay-preventing mechanisms can also be used.

In pay-TV systems, some operators propose multi-device subscription for a discounted price compared to multiple subscriptions, therefore allowing to share a subscription between multiple receiver devices of a same household. In this situation, a multi-device subscriber may be tempted to sell one of his devices to another customer, therefore reducing his personal cost. However such usage is generally not authorized by the terms of service of the provider since it would lower the overall income of the provider. To fight against such illegitimate usage of the devices, the secure device pairing mechanism needs to be improved to prevent attacks where the device to be paired are too far away from each other and where the legitimate user collaborates with the illegitimate user.

It can therefore be appreciated that there is a need for a solution for secure device pairing that addresses at least some of the problems of the prior art. The present disclosure provides such a solution.

SUMMARY

The present disclosure describes an apparatus and a method for securely and automatically authorizing access to a service on a first device upon detection of a second device located in near proximity, while only using a single broadcast authorization message. Master device broadcasts a message comprising at least a group identifier common to the set of devices that can access the service and a time reference value corresponding to the emission time of the authorization message, according to a common time reference received by all devices from another broadcast network. A slave device authorizes access to the service only if the group identifier received from the authorization message is the same as the predetermined group identifier of the device and if the delay between the measured arrival of the authorization message and its emission time is lower than a threshold.

In a first aspect, the disclosure is directed to a method for controlling access to a service on a first device, comprising at a processor of a first device: obtaining a time reference through a first broadcast communication network; obtaining a message from a second device through a second broadcast communication network, wherein the message comprises at least a group identifier common to a set of devices for which the service is authorized and an emission time of the message on the second broadcast communication network, where the emission time is given with reference to the time reference obtained from the first broadcast communication network; determining a transmission delay by subtracting the emission time of the message comprised in the message from an arrival time of the message, where the arrival time is measured by the first device with reference to the time reference obtained from the first broadcast communication network; determining the validity of the received message, the message being determined valid in case the group identifier comprised in the message is the same as the group identifier of the first device and in case said transmission delay is lower than a threshold; increment (450) a counter in case the received message is valid; and authorizing the access to the service when the counter is greater than zero.

Various embodiments of first aspect comprise:
decrementing the counter at determined time intervals;
extracting from the received message a value reflecting the number of retransmissions allowed; when the value reflecting the number of retransmissions allowed is greater than zero: build a new message wherein the emission time is updated and the value reflecting the number of retransmissions is decremented; transmit the new message on the second broadcast communication network;
using wireless technology for the second broadcast communication wherein this technology is designed to have limited coverage;
using an absolute time reference;
using an relative time reference;

authorizing a service wherein the service to be authorized is one of access to a television channel, access to a personal image, access to a personal video and access to a device setup.

In a second aspect, the disclosure is directed to a device for controlling access to a service on a first device, comprising: an interface to a first broadcast communication network configured to obtain a time reference through the first broadcast communication network; an interface to a second broadcast communication network configured to obtain a message from a second device through the second broadcast communication network, wherein the message comprises at least a group identifier common to a set of devices for which the service is authorized and an emission time of the message on the second broadcast communication network, where the emission time is given with reference to the time reference obtained from the first broadcast communication network; memory configured to store at least a group identifier common to the set of devices for which the service is authorized and a value indicating if the device is a first or second device; a processor configured to: determine a transmission delay by subtracting the emission time of the message comprised in the message from an arrival time of the message, where the arrival time is measured by the first device with reference to the time reference obtained from the first broadcast communication network; determine the validity of the received message, the message being determined valid in case the group identifier comprised in the message is the same as the group identifier of the first device and in case said transmission delay is lower than a threshold; authorize the access to the service when the received message is valid.

In a variant embodiments of the second aspect:
the interface to the first broadcast communication network is one of a satellite broadcast interface, a terrestrial broadcast interface, a cable network interface and a broadband network;
the technology of the interface to the second broadcast communication network is one of WiFi, ZigBee and Bluetooth.

In a third aspect, the disclosure is directed to a computer program comprising program code instructions executable by a processor for implementing any embodiment of the method of the first aspect.

In a fourth aspect, the disclosure is directed to a computer program product which is stored on a non-transitory computer readable medium and comprises program code instructions executable by a processor for implementing any embodiment of the method of the first aspect.

BRIEF DESCRIPTION OF DRAWINGS

Preferred features of the present disclosure will now be described, by way of non-limiting example, with reference to the accompanying drawings, in which.

DESCRIPTION OF EMBODIMENTS

Figure 1:
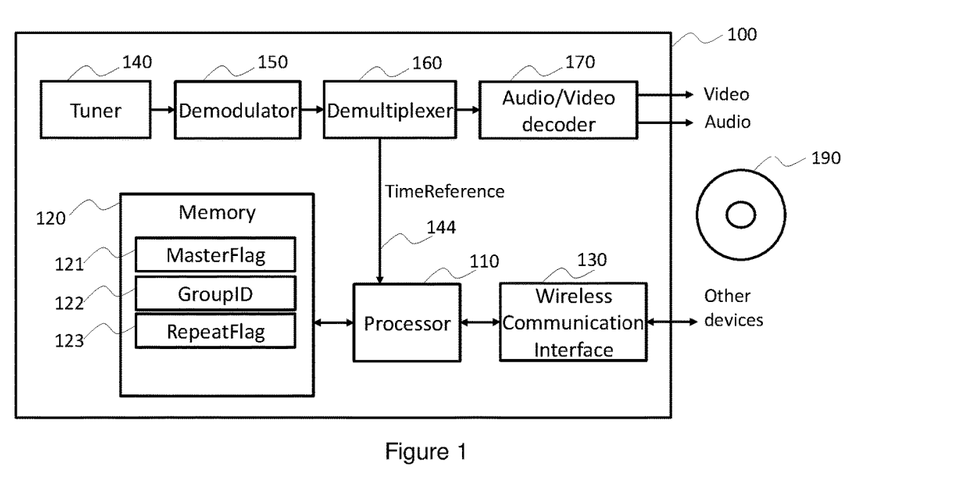
FIG. 1 illustrates an exemplary receiver device in which the disclosure may be implemented.

FIG. 1 illustrates an exemplary apparatus of a receiver device 100 in which the disclosure may be implemented. The skilled person will appreciate that the illustrated device is very simplified for reasons of clarity. According to a specific and non-limiting embodiment of the principles, the receiver device 100 comprises at least one hardware processor 110 configured to execute a method of at least one embodiment of the present disclosure, memory 120 configured to store at least one of a master flag 121 indicating if the device is a slave or a master, a group identifier 122, a repeat flag 123 indicating if beacon authorization message should be repeated to enhance coverage or not, a wireless communication interface 130 configured to interact with remote devices, a tuner 140 configured to receive a broadcast signal from a service provider, a demodulator 150 configured to demodulate the received signal, a demultiplexer 160 configured to demultiplex the demodulated signal and an audio-video decoder 170 configured to decode the demultiplexed audio and video signals and deliver them for rendering to the user. A non-transitory computer readable storage medium 190 stores computer readable program code that is executable by the processor 110 to perform at least one of the methods described herein. Conventional wireless communication interfaces using Bluetooth™, ZigBee, or WiFi technologies constitute examples of the wireless communication interface 130 and have an operating range approximately corresponding to a household. Other network interfaces may be used.

The group identifier 122 is common to a subset of devices that belong to an authorized group of devices, for example a common household or a unique subscriber account, and are allowed to share a set of common services. Each device of this group possesses a common group identifier value that is obtained according to different techniques. The group identifier may be set at manufacturing or personalization stage, by the manufacturer or service operator, before delivering the device to the user. It can also be set in the user's home through an installation phase performed by the user, for example by using a subscriber smartcard or simply by the reception of subscriber management messages provided by the service operator and received through the broadcast signal.

The demultiplexer 160 extracts a time reference 144 from the broadcast signal. Such time reference can take multiple forms. When the broadcast signal is transmitted as a conventional MPEG2 transport stream, the MPEG timing model is preferably used to maintain a system time clock in all receiver devices and ensure temporal synchronization between the receiver devices. In such an environment, the time reference is considered to be absolute, meaning that it is possible to measure an absolute value of time in any of the receiver devices and that those measured time values are synchronized. When no absolute time reference is available, a relative time reference can be used. This is done by inserting periodically at the broadcaster side a counter value, either incrementing or randomized, into a special packet of the broadcast signal stream to establish a temporal reference. This value will be taken as time reference by the receiver devices, since in a broadcast model, the devices of a household receive the same broadcast signal and therefore receive the counter value at essentially the same time.

Figure 2:
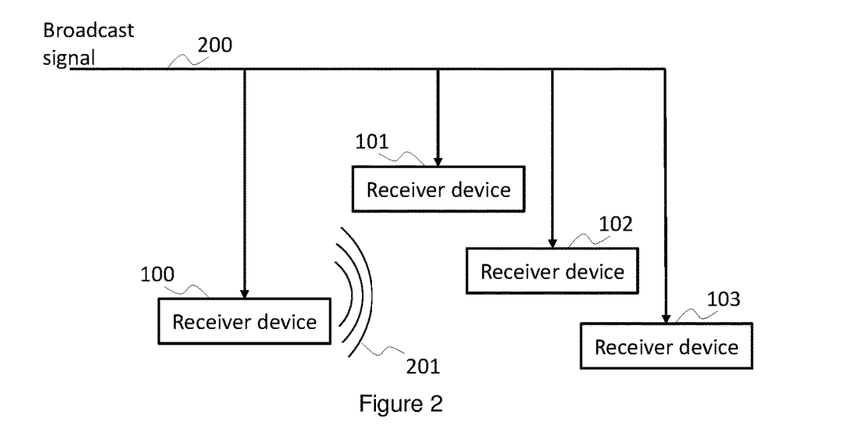
FIG. 2 illustrates an exemplary setup of a household according to an embodiment of the disclosure.

FIG. 2 illustrates an exemplary setup of a household according to an embodiment of the disclosure. In such a setup, the household comprises a set of four receiver devices 100, 101, 102 and 103. These devices receive a same broadcast signal 200, either from a roof antenna in case of terrestrial broadcast, a satellite dish in case of satellite broadcast or a cable connection in case of cable broadcast.

The receiver device 100 has been chosen as master device. The other devices are slave devices. This choice uses conventional techniques and is out of scope of the disclosure. It is for example either done at manufacturing or can be determined between deployed devices, for example by voting or by management messages received through the broadcast signal 200. A master flag (121 in FIG. 1) in the receiver device is set accordingly to the choice.

When powered on, the master device 100 starts to broadcast through its wireless communication interface, for example using Bluetooth™ or ZigBee beacons broadcast messages, an authorization message comprising the group identifier (122 in FIG. 1) and a time reference value corresponding to the time when the message is emitted. The authorization message is differentiated from other messages by conventional techniques, for example using a particular value in a particular field according to the protocol used. The other (slave) receiver devices of the household receive the authorization messages through their wireless communication interfaces. When no authorization message is received, the receiver does not authorize the service. When an authorization message is received, the receiver device first checks that the group identifier comprised in the message is the same as its own group identifier, and when this is the case, determines the delay between the time reference of the transmission of the message, as inserted by the master device in the message, and the time reference of its reception, as measured by the receiver device. The receiver device authorizes the service only if this delay is lower than a threshold. This measure allows to verify that the message has been transmitted using the direct wireless communication that is physically restricted to a given perimeter and providing short transmission delays. Retransmitting the authorization message on other communication interfaces would allow to a malicious user to overcome the geographical limitation but would increase the transmission delay to a value higher than the threshold and therefore the service would not be authorized. This threshold is for example determined to be smaller to a retransmission delay of the message using conventional transmission means. A threshold value of 7 ms is a good example. The value of the threshold is configurable.

Examples of services are access to a pay-TV channel, access to personal user data such as private pictures and videos, launch of an application and access to device setup.

The man skilled in the art will appreciate that the authorization message broadcast by the master device is preferably encrypted to prevent a malicious user to forge valid messages easily. The ciphering could for example use a symmetrical encryption algorithm such as a XOR operation or the well-known Advanced Encryption Standard (AES) algorithm and a secret key generated using the group identifier, since it is a common shared secret between all receiver devices belonging to the same household. The slave receiver device will be able to decrypt the authorization message using the same algorithm with the secret key generated using the group identifier to recover the unencrypted data comprising at least the group identifier and the time reference. An attacker will not be able to forge such an authorization message without knowing the group identifier. Furthermore, the attacker would not be able to decide when to provide such a forged message since the validity of an authorization message depends on its arrival time.

Figure 3:
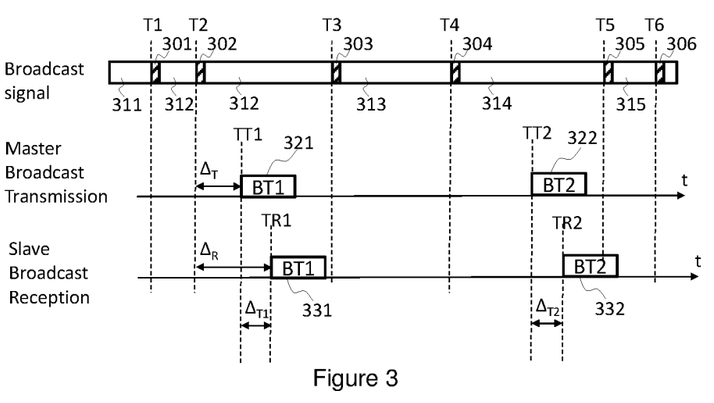
FIG. 3 illustrates a timing diagram of the messages exchanged in an exemplary setup of a household according to an embodiment of the disclosure.

FIG. 3 illustrates a timing diagram of the messages exchanged in an exemplary setup of a household according to an embodiment of the disclosure. In this figure, the first line shows the broadcast signal sent by the broadcast provider to all households. All the devices of the household receive the same broadcast signal. In this signal, the elements 311, 312, 313, 314, 315, 315 correspond to the emission of miscellaneous data, for example comprising data related to audio or video content while the elements 301, 302, 303, 304, 305, 306 correspond to the emission of time reference information. In a preferred embodiment, the time reference information is absolute, for example including timestamp values, allowing each of the receiver devices to synchronize an internal clock with these timestamps. Therefore, the receiver devices are able to determine an absolute time value that is synchronized with the other receiver devices. The second line shows the transmission of the authorization messages 321, 322 emitted by the receiver device chosen as master device. This device broadcasts these authorization messages from time to time, for example at constant time intervals or randomly between a minimal interval value and a maximal interval value. An example of interval range value is from one second to one minute. When fast reactivity of devices is required, the time interval is set to one second for example. For less stringent applications, the time interval is for example set to one minute.

In the preferred embodiment, the time reference information carried in the broadcast signal by elements 301 to 306 are absolute. In this case, the authorization message comprises the group identifier and an absolute time reference values corresponding to the emission time of the message. Message 321 comprises the time reference value TT1 while message 322 comprises the time reference value TT2. The third line shows the reception of the authorization messages 331, 332 by the slave receiver devices. These devices measure the absolute time reference value corresponding to the arrival time of the messages received from the master. In this figure, the message 331 corresponds to the reception of the message 321. Its arrival time TR1 is measured and the transmission delay $\Delta_{T1}$ is determined by subtracting the value TT1 extracted from the message data to the measured value TR1. When this value $\Delta_{T1}$ is higher than the threshold, it is considered that the message has not been transmitted directly through the wireless transmission and has been relayed over another network, probably out of range of the wireless operating range and therefore outside the scope of the household.

In a variant embodiment, the time reference information carried in the broadcast signal by elements 301 to 306 are relative, for example including an incrementing counter value or random values. The principles described above still apply with the following differences. The authorization message broadcast by the master device does not comprise an absolute time reference but comprises the value of the last relative time reference as well as a delay measured by the master device between the last relative time reference data received from the broadcast signal and the emission time of the message. In the example of FIG. 3 applied to the case where the time reference is relative, the message 321 comprises the value of the last relative time reference to enable the further verification that the master and slave devices are using the same relative time reference data. The message 321 comprises also the relative emission delay, represented by $\Delta_T$ in the figure, determined by subtracting the value of the last relative time reference T2 from the value of the emission time TT1. When receiving the message, the slave receiver device first determines the delay $\Delta_R$ by subtracting the relative time reference data T2 indicated in the message from the value of the reception time of the message and then determines the transmission delay $\Delta_{T1}$ by subtracting the delay $\Delta_T$, which has been extracted from the received message, from the delay $\Delta_R$.

Figure 4:
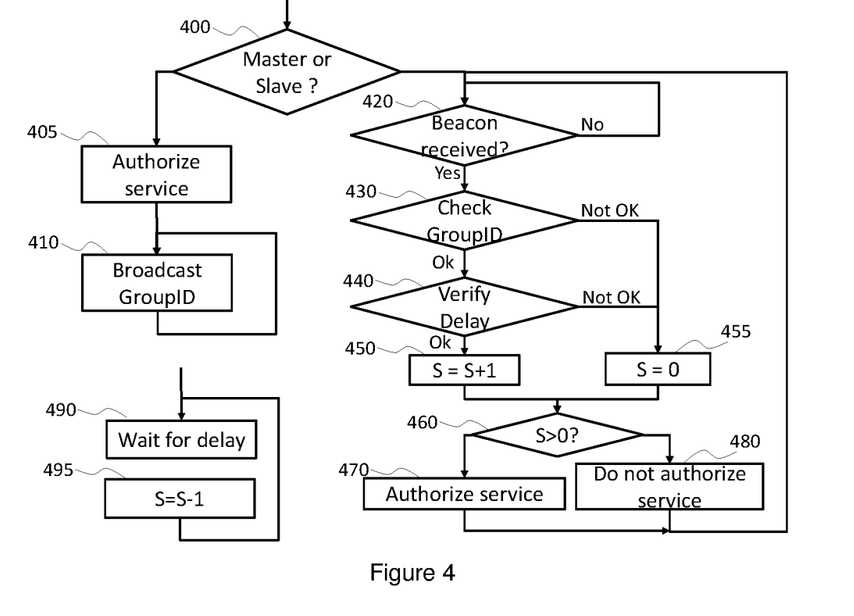
FIG. 4 illustrates an exemplary flowchart of a receiver device according to an embodiment of the disclosure.

FIG. 4 illustrates an exemplary flowchart of receiver device according to an embodiment of the disclosure. In step 400, the receiver device checks whether it is configured as a master or slave device. This is done, for example, by checking the value of the master flag (121 in FIG. 1).

When the receiver device is the master device, in step 405, the service is authorized. Example of services comprise the access to television services including pay-tv channels or the access to stored data such as personal pictures. Then in step 410, the master device transmits an authorization message iteratively, from time to time, using its wireless communication interface configured to transmit messages in a broadcast manner using an appropriate broadcast protocol. The authorization message comprises at least the group identifier and a time reference value corresponding to the time when the message is emitted.

When the receiver device is a slave device, in step 420, it checks for reception of an authorization message through its wireless communication interface configured to receive broadcast messages for example under the form of Bluetooth™ or ZigBee beacons. When an authorization message is received, the slave device stores the arrival time, verifies that the format of the message is correct and extracts the data carried by the message. In step 430, the group identifier extracted from the received message is compared to the group identifier (122 in FIG. 1) of the slave device. If the identifiers match, the transmission delay $\Delta_T$ is verified in step 440. In the preferred embodiment using absolute time references, the delay is determined by subtracting the arrival time of the message, as measured by the slave device, to the emission time of the message, as inserted by the master device in the message. In a variant embodiment using relative time references, the slave device first verifies that the relative time reference value serving as reference is correct by checking if the relative time value (302 in FIG. 3) previously received and stored by the slave device matches with the relative time value extracted from the message perform, and then performs the subtraction between the relative times of arrival of the message and the emission time extracted from the message. When this delay is lower than the threshold, the authorization message is considered to be valid and a success counter S is incremented in step 450. The person skilled in the art will appreciate the order between steps 430 and 440 has no importance: both conditions need to be fulfilled to consider the authorization message as valid. When one of the former checks of steps 430 or 440 is incorrect, the success counter S is set to zero, in step 455. The success counter S is checked, in step 460. When the success counter S is greater than zero, the service is authorized, in step 470. When the success counter S is equal to zero or negative, the service is no more authorized. The success counter S is set to zero for example when powering the device on and is decremented, in step 495, from time to time, after waiting a delay, in step 490, for example each second, except when already null. The decrement operation ensures that if no authorization message is received during a certain time, for example in the case where the master receiver device has been relocated to another household, the authorization to access the service is cancelled. The increment operation allows to be resistant to temporary perturbations on the wireless network that could prevent a legitimate slave device to receive the authorization messages during a certain time. For example, in the case the success counter S is decremented each minute and is incremented up to a maximal value of 10, such device resists to a continuous wireless perturbation lasting several minutes, assuming the master device sends out authorization messages at least every minute. A ratio of two between the frequency of transmission of the authorization messages and the decrement operation of the success counter is advantageously used to increase the robustness.

Figure 5:
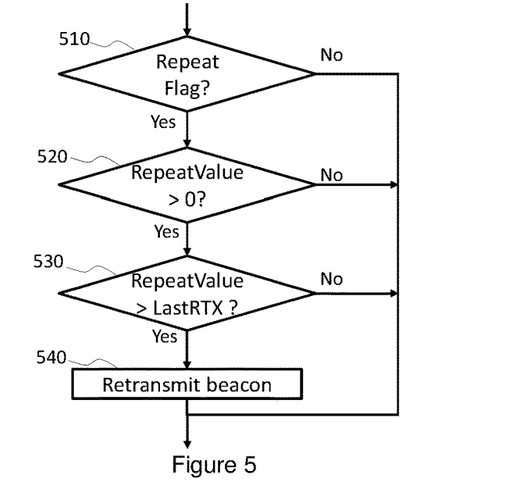
FIG. 5 illustrates an exemplary flowchart of a variant embodiment of a receiver device according to an embodiment of the disclosure where the coverage of the authorization is enhanced through retransmission by the receiver devices.

FIG. 5 illustrates an exemplary flowchart of a variant embodiment of receiver device according to a variant embodiment of the disclosure where the coverage of the authorization is enhanced by through retransmission by the receiver devices. These steps complement the flowchart of FIG. 4 and take place when the validity of the authorization message has been successfully verified, between steps 440 and 450. To enhance the coverage, the repeat flag (123 in FIG. 1) must be set in at least one slave receiver device and the master receiver device. This has for effect to require the slave devices to retransmit the received authorization message, allowing to reach slave devices that are outside the transmission coverage of the master device. The number of generation of retransmissions allowed by the system is under control of the master device and indicated by an additional value in the authorization message called repeatValue that indicates the number of remaining generation of retransmission. When the master device emits a first authorization message, the repeatValue of this message is set to the number of generations of retransmissions to be allowed. Setting the value to 0 would prevent any further retransmission by the slave receiver devices.

Prior to step 510, the receiver device already verified that it is a slave device and that the authorization message is valid. In step 510, the device verifies that its repeat flag (123 in FIG. 1) is set. Then, in step 520, it checks the repeatValue extracted from the authorization message and verifies that it is strictly higher than zero. When this is not the case, then no retransmission is performed by this device. When the repeatValue is higher than zero, the device checks, in step 530, that it did not already retransmit an authorization message of the same generation, since this otherwise could lead to infinite retransmissions. This check is done by storing the repeatValue of the last authorization message that has been retransmitted by the device (LastTRX) and comparing it to the repeatValue of the received authorization message. The retransmission is only allowed when the latter value is higher than lastTRX. In this case, the slave device will retransmit the received authorization message, in step 540, after having performed the following modifications: the repeatValue is decremented and the emission time of the message is updated to the emission time of the retransmission.

Figure 6:
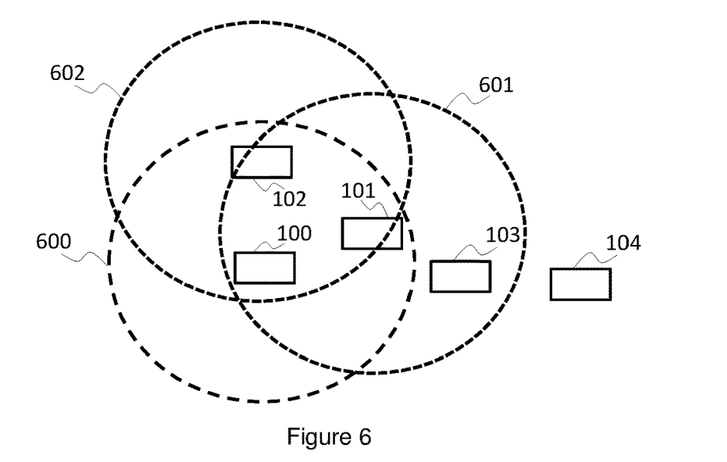
FIG. 6 illustrates an exemplary setup of a household according to a variant embodiment of the disclosure to enhance the coverage of the pairing.

FIG. 6 illustrates an exemplary setup of a household in which a variant embodiment of the disclosure may be implemented to enhance the coverage of the pairing. The Figure illustrates the steps detailed in FIG. 5 and shows the master device 100 and four slave devices 101, 102, 103 and 104. The circles 600, 601, 602 respectively illustrate the wireless coverage areas of devices 100, 101 and 102. The master device 100 emits a first authorization message in the area 100 with the repeatValue set to 1. This message is received by the slave devices 101 and 102. Both devices 101 and 102 validate the validity of the authorization message, authorize the service, and since their repeat flag (123 in FIG. 1) is set, retransmit this authorization message after having decremented its repeatValue to 0, updated its emission time and stored the value 0 in lastRTX. The authorization message emitted by slave 101 is received by slave device 103 and device 103 authorizes the service but does not retransmit the message again since the repeatValue is 0. The slave device 102 also receives the authorization message retransmitted by device 101. However, it will not retransmit it since the repeatValue extracted from the received message is not greater than the lastRTX stored by the device 102. In this example, the device 104 is too far away from the others and does not authorize the service since it did not receive any of the messages, although this device shares the same group identifier as the other devices.

Figure 7A:
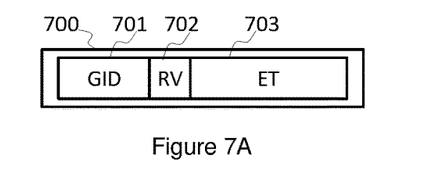
FIG. 7A illustrates an exemplary payload of authorization messages according to a preferred embodiment of the disclosure using absolute time reference.
Figure 7B:
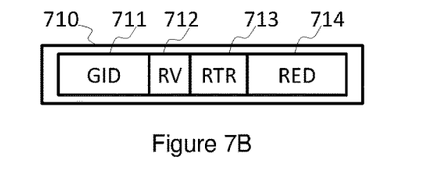
FIG. 7B illustrates exemplary payload of authorization messages according to a variant embodiment of the disclosure using relative time reference.

FIG. 7A illustrates an exemplary payload of an authorization message according to the preferred embodiment of the disclosure using absolute time reference. The message 700 comprises the group identifier (GID) 701, the repeatValue (RV) 702 and the emission time (ET) 703. FIG. 7B illustrates an exemplary payload of an authorization message according to a variant embodiment of the disclosure using relative time reference. The message 710 comprises the group identifier 711, the repeatValue 712, the relative time reference (RTR) 713 and the relative emission delay (RED) 714. In both embodiments, the repeatValue filed is present. When no retransmission of the authorization message is desired, the value of this field is set to zero, preventing any retransmission. The person skilled in the art will appreciate that the payload data described in FIGS. 7A and 7B may be encapsulated in a higher-level message format according to the broadcast communication network. For example, when using Bluetooth BLE, the data are preferably encapsulated in so-called non-connectable undirected advertising event, allowing to send a short broadcast message with low overhead data. In a variant embodiment, the hardware processor 110 preferably takes the form of a tamper resistant processor to increase the level of security of the system. Such processor often comes under the form of a smartcard to be inserted to a smartcard reader of the device. This allows to perform the operations of the disclosure in a secure manner, preventing observation and modification of sensible data by an attacker.

As will be appreciated by one skilled in the art, aspects of the present principles can take the form of an entirely hardware embodiment, an entirely software embodiment (including firmware, resident software, micro-code and so forth), or an embodiment combining hardware and software aspects that can all generally be defined to herein as a "circuit", "module" or "system".

Furthermore, aspects of the present principles can take the form of a computer readable storage medium. Any combination of one or more computer readable storage medium(s) can be utilized. It will be appreciated by those skilled in the art that the diagrams presented herein represent conceptual views of illustrative system components and/or circuitry embodying the principles of the present disclosure. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The invention claimed is:

1. A method for controlling access to a service on a first device, comprising at a processor of the first device:
    obtaining a time reference through a first broadcast communication network;
    obtaining a message from a second device through a second broadcast communication network, wherein the message comprises at least a group identifier common to a set of devices for which the service is authorized and an emission time of the message on the second broadcast communication network, where the emission time is given with reference to the time reference obtained from the first broadcast communication network;
    determining a transmission delay between the emission time of the message and an arrival time of the message, wherein the emission time of the message is comprised in the message and the arrival time is measured by the first device with reference to the time reference obtained from the first broadcast communication network;
    determining the validity of the received message, the message being determined valid in case the group identifier comprised in the message is the same as the group identifier of the first device and in case said transmission delay is lower than a threshold; and
    authorizing the access to the service in case the received message is valid.

2. The method according to claim 1 further comprising additional access constraints based on a counter, wherein access to the service is authorized only when the counter is greater than zero, said counter being incremented in case the received message is valid and decremented at determined time intervals.

3. The method according to claim 1 further comprising:
    extracting from the received message a value reflecting the number of retransmissions allowed; and
    when the value reflecting the number of retransmissions allowed is greater than zero:

build a new message wherein the emission time is updated and the value reflecting the number of retransmissions is decremented; and transmit the new message on the second broadcast communication network.

4. The method according to claim 1, wherein the second broadcast communication is wireless and configured to have limited coverage.

5. The method according to claim 1, wherein the time reference is an absolute time reference.

6. The method according to claim 1 wherein the time reference is a relative time reference.

7. The method according to claim 1 wherein the service to be authorized is one of access to a television channel, access to a personal image, access to a personal video and access to a device setup.

8. Computer program comprising program code instructions executable by a processor for implementing the steps of a method according to claim 1.

9. Computer program product which is stored on a non-transitory computer readable medium and comprises program code instructions executable by a processor for implementing the steps of a method according to claim 1.

10. A device for controlling access to a service on a first device, comprising:

an interface to a first broadcast communication network configured to obtain a time reference through the first broadcast communication network;

an interface to a second broadcast communication network configured to obtain a message from a second device through the second broadcast communication network, wherein the message comprises at least a group identifier common to a set of devices for which the service is authorized and an emission time of the message on the second broadcast communication network, where the emission time is given with reference to the time reference obtained from the first broadcast communication network;

memory configured to store at least a group identifier common to the set of devices for which the service is authorized and a value indicating if the device is a first or second device; and a processor configured to:

determine a transmission delay between the emission time of the message and an arrival time of the message, wherein the emission time of the message is comprised in the message and the arrival time is measured by the first device with reference to the time reference obtained from the first broadcast communication network;

determine the validity of the received message, the message being determined valid in case the group identifier comprised in the message is the same as the group identifier of the first device and in case said transmission delay is lower than a threshold; and authorize the access to the service when the received message is valid.

11. The device according to claim 10 further comprising additional access constraints based on a counter, wherein the access to the service is only authorized when the counter is greater than zero, said counter being incremented in case the received message is valid and decremented at determined time intervals.

12. The device according to claim 10 wherein the interface to the first broadcast communication network is one of a satellite broadcast interface, a terrestrial broadcast interface, a cable network interface and a broadband network.

13. The device according to claim 10 wherein the interface to the second broadcast communication network is using one of WiFi, ZigBee and Bluetooth technologies.

14. The device according to claim 10 wherein the service to be authorized is one of access to a television channel, access to a personal image, access to a personal video and access to a device setup.

* * * * *